July 27, 1943.  B. F. MULDOON  2,325,070
DRY BATTERY CELL
Filed Oct. 11, 1939
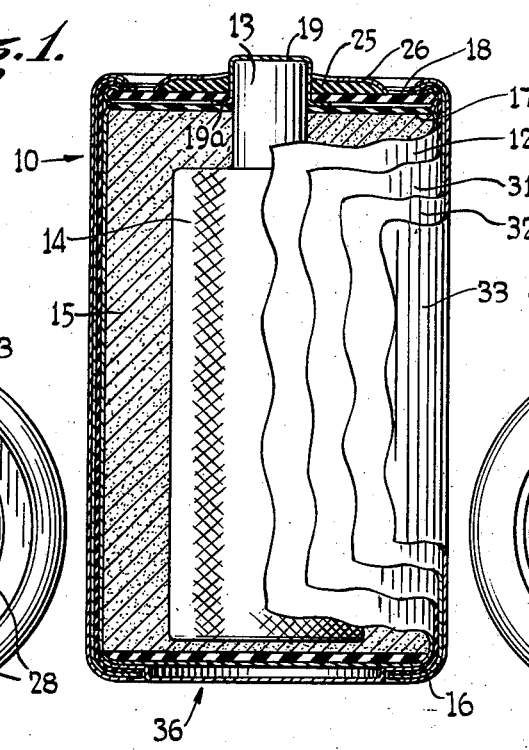
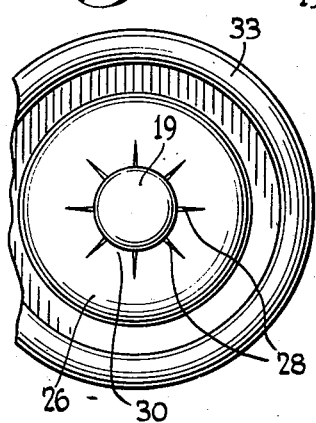
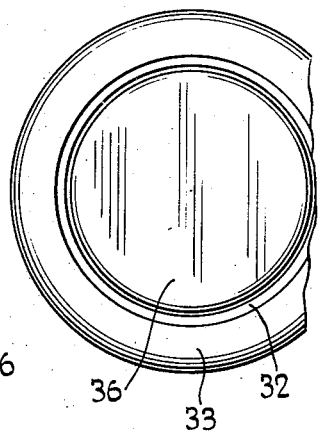
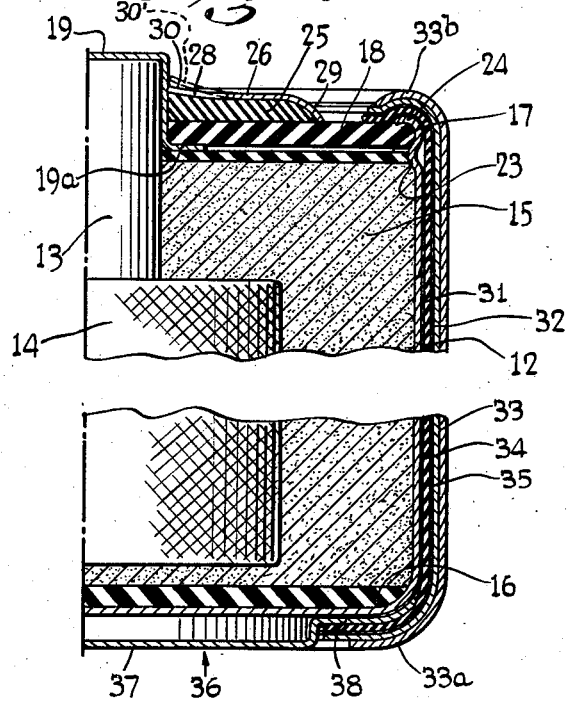
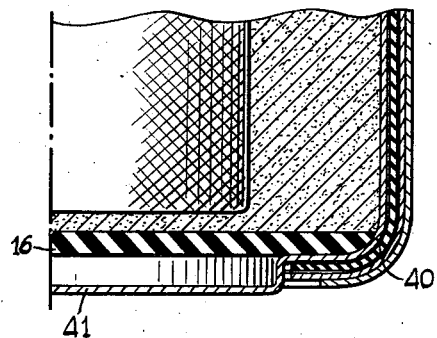
INVENTOR
BERNARD FRANCIS MULDOON
BY
ATTORNEY Patented July 27, 1943

2,325,070

UNITED STATES PATENT OFFICE 2,325,070

DRY BATTERY CELL

Bernard Francis Muldoon, Mountain View, N. J., assignor to Henry Hyman, Brooklyn, N. Y.

Application October 11, 1939, Serial No. 298,938

12 Claims. (Cl. 136—107).

This invention relates generally to dry battery cells.

One of the objects of my invention is to provide a dry cell construction which shall be characterized by its highly improved and novel means for preventing leakage from the interior thereof.

Another object of my invention is to provide an improved dry cell construction having terminals on different faces thereof wherein all parts of the cell other than the terminals are electrically insulated from the exterior of the battery by novel water-impermeable means.

Still another object of my invention is to provide a novel dry cell construction of the character described which shall comprise relatively few and simple parts, be easy to assemble, economical to manufacture, rugged in construction and which at the same time shall be highly efficient in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which are shown various possible embodiments of this invention, Fig. 1 is an elevational view in partial section of a dry cell constructed in accordance with my invention;

Fig. 2 is a top plan view thereof;

Fig. 3 is a bottom plan view thereof;

Fig. 4 is an enlarged sectional view of a portion of the dry cell shown in Fig. 1; and Fig. 5 is a fragmentary sectional view of the bottom portion of a dry cell similar to that shown in Fig. 4, but illustrating a modified form of my invention.

Referring now in detail to the drawing and more particularly to Figs. 1 through 4, I have shown a dry cell 10 constructed in accordance with my invention and comprising an outer zinc cup electrode 12 and an inner or central carbon electrode 13. A bobbin 14 of usual construction may envelop all but a small portion of the carbon electrode 13 adjacent the upper end thereof, as is clearly shown in Figs. 1 and 4. The space between the two electrodes 13 and 14 is filled with any well known electrolytic substance 15 generally employed in the art. Paraffined washers 16 and 17 may be disposed interiorly of the zinc cup 12 at the top and bottom thereof to form the upper and lower boundaries for the electrolytic paste 15, the upper washer 17 having a central aperture adapted to snugly surround the upwardly projecting portion of the carbon electrode 13. At the upper end of the carbon electrode 13 there may be provided a metallic cap 19 of electrically conductive material, such as brass, snugly encasing the said electrode end and having a bottom outwardly extending flange portion 19a overlying the washer 17. Overlying the washer 17 and the flange 19a and surrounding the cap 19 is another centrally apertured insulating washer or layer of insulating material 18 suitably moisture-proofed or fabricated from moisture-proof material. The said metallic cap 19 is adapted to act as a contacting terminal of my improved battery cell 10.

To hold the said washers 17 and 18 in position, the zinc cup 12 may be worked in any manner well known to the art to provide means on the interior thereof for satisfactorily supporting these washers. Such means may comprise an annular groove 23 pressed tightly against the paraffined washer 17 and a bead or crimped lip 24 receiving the edge of the said washer 17 therein and which clasps a portion adjacent the periphery thereof, as shown in Figs. 1 and 4.

In dry cells of the type herein described, the constructions heretofore employed for the cell to prevent the escape of moisture or salts from the interior thereof has depended entirely upon the close engagement of the layer or layers of material above the electrolytic paste with the metallic cup at the periphery of said layers and with the carbon electrode and metallic cap at the central apertures of said layers. Thus, in the dry cell 10 illustrated in the drawing, the frictional engagement of the washers 17 and 18 with the carbon electrode 13 and the brass cap 19 and the groove 23 and bead 24 holding said washers 17 and 18 would hitherto be all that was relied upon to prevent seepage of moisture or chemicals from the interior of the battery. Such previous constructions have proven to be inefficient for properly sealing the dry cell, especially when a heavy discharge of gas or vapor is liberated within the cell. In such cases, the gas forces a path to the exterior of the cell around the electrode 13 and the periphery of the washers 17 and 18, and leaves a permanent space through which seepage occurs.

By my invention I have provided the following novel and improved means for sealing the dry cell against such leakage. A washer 25 of resilient material, such as rubber, is employed which is designed to encircle the electrode-covering cap 19 and rest upon the upper moisture-proof washer 18, the central aperture of said washer preferably having a lesser diameter than that of said cap 19 so that the said washer 18 will press tightly against the cap 19. A gripping member 26 is provided surrounding the cap 19 and overlying the rubber washer. The grip member 26 may be made of flat metallic material and provided with centrally disposed aperture which may be slightly smaller in diameter than the cap 19. The member 26 is provided with a plurality of slots 28 extending radially outwardly from the said central aperture. A downwardly turned flange 29 may also be provided at the periphery of said member 26 to conceal the edge of the rubber washer 25 and also to aid in compressing the same. Before the gripping member 26 is placed over the cap 19 to cover the rubber washer 25, the fingers 30 formed between the slots 28 are bent upwardly at a slight angle, so as to permit the cap 19 to freely pass through the gripping member aperture. The member 26 is then pressed down tightly against the rubber washer 25 and the fingers 30 are then forced downwardly from their dotted line position 30' to the full line position, to cause the said fingers to bite into and grip the side wall 20 of the metallic cap 19. The washer 25 is thus permanently held under compression against the moisture-proof washer 18.

For sealing the dry cell against leakage in the area adjacent the outer metal cup electrode 12, I provide a jacket 31 of resilient material, such as rubber, contactively overlying the outer surface of said electrode 12. Superimposed on the sheet rubber jacket 31 is a paper sleeve 32 and superimposed on said paper sleeve 32 is a metal cover 33 forming the outermost covering for the side wall of the dry cell 10. The jacket 31, the sleeve 32 and the cover 33 are all made longer than the side wall of the zinc cup electrode 12, the purpose of which will soon become apparent. If desired, the rubber jacket 31 may be coated with layers of adhesive 34 and 35 on opposite surfaces thereof, to retain the same in position. A terminal member 36 of electrically conductive material and comprising a central shallow cup portion 37 and a flange 38 is disposed at the bottom of the dry cell 10, with the flange 38 contactively engaging the zinc cup 12, as clearly shown in Figs. 1 and 4. The lower end 33a of the outer metal cover 33 is turned so that it will force the jacket 31 and paper sleeve 32 up against the flange 38 of the lower battery terminal 36 and hold the said terminal 36 captively in position. The upper edge 33b of the outer cover 33 is crimped over the beaded lip 24 of the zinc cup 12, thereby compressing the edge of the rubber jacket 31 as well as the sleeve 32 against the moisture-proof washer 18. In order to prevent the metal cover 33, which forms the entire outer side wall of my improved dry cell 10, from carrying any electric potential, the rubber jacket 31 is made slightly longer than the metal cover 33, so as to extend beyond the said cover 33 at opposite ends thereof, to thus insulate the cover 33 from the zinc electrode 12 and from the terminal member 36.

It will thus be seen that I have provided resilient sealing means surrounding the junction of both electrodes 12 and 13 with the upper layer or washer 18 of the dry cell, so that moisture or salts will not seep through from the interior of the dry cell, notwithstanding gas under pressure may be forced therethrough.

In Fig. 5 I have shown a modified form of dry cell embodying my invention, wherein the outer zinc cup electrode 40 is formed at the bottom thereof with an integral depressed cup portion 41, which serves as a terminal in place of the separate terminal member 36 described in conjunction with the Figs. 1 to 4 form of my invention.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In an electric dry cell comprising a metal cup electrode, a core electrode and an upper layer of insulating material interposed between said electrodes, independent resilient means for rendering the junction of said metal cup electrode and said insulating material leak-proof, said means being overlaid and pressed against said cup and said material adjacent the junction thereof.

2. In an electric dry cell comprising a metal cup electrode, a core electrode and an upper layer of insulating material interposed between said electrodes, resilient means overlying said insulating material for rendering the junction of said core electrode and said insulating material leak-proof and means frictionally engaging said core to press said resilient means against said core and said material adjacent the junction thereof.

3. In an electric dry battery comprising a metal cup electrode, a core electrode and an upper layer of insulating material interposed between said electrodes, an independent resilient member for rendering the junction of said metal cup electrode and said insulating material leak-proof, said member being overlaid and pressed against said cup and said core adjacent the junction thereof, an independent resilient member for rendering the junction of said core electrode and said insulating material leak-proof, and means frictionally engaging said core to press said second resilient member against said core and said material adjacent the junction thereof.

4. In an electric dry cell comprising a metal cup electrode, a core electrode and an upper layer of insulating material interposed between said electrodes, resilient means for preventing the escape of moisture or salts from the interior of the cell through the junction of said metal cup electrode and said insulating material, said last named resilient means comprising a tubular sheet of flexible, resilient material encircling said cup electrode and having the upper edge thereof projecting slightly beyond the adjacent upper edge of said cup electrode, said projecting sheet edge being folded over the cup electrode edge to overlie the junction of said cup electrode with said insulating material, and means disposed over said rubber sheet to press said sheet against said junction.

5. In an electric dry cell comprising a metal cup electrode, a core electrode and an upper layer of insulating material interposed between said electrodes, resilient means for rendering the junction of said metal cup electrode and said insulating material leak-proof, said last named resilient means comprising a flexible, resilient sheet encircling said cup electrode and having the upper edge thereof projecting beyond the adjacent upper edge of said cup electrode, said projecting sheet edge being folded over the cup electrode edge to overlie the junction of said cup electrode with said insulating material, and a member of relatively rigid material substantially coextensive with and overlying said sheet and pressing said folded over sheet portion against the top surface of said insulating material.

6. In an electric dry cell comprising a metal cup electrode, a core electrode projecting from said cell and an upper layer of insulating material interposed between said electrodes, a metallic cap covering said projecting end of said core electrode, resilient means for rendering the junction of said core electrode and said insulating material leak-proof, said last named resilient means comprising a flexible resilient washer encircling said cap and overlying said insulating material, and a relatively rigid washer overlying said flexible washer and adapted to frictionally engage said cap to maintain said flexible washer under compression.

7. In an electric dry cell comprising a metal cup electrode, a core electrode and an upper layer of insulating material interposed between said electrodes, resilient means for rendering the junction of said core electrode and said insulating material leak-proof, said last named resilient means comprising a flexible, resilient washer encircling said core electrode and overlying said insulating material, and a relatively rigid washer overlying said flexible washer, said rigid washer having a plurality of fingers extending inwardly thereof and adapted to frictionally engage said core electrode to maintain said flexible washer under compression.

8. An electric dry cell comprising an outer metal cup electrode having a bottom wall, an inner core electrode, an upper layer of insulating material interposed between said electrodes, a rubber sleeve encircling said outer electrode and a cover of relatively rigid material overlying said rubber sleeve, the upper and lower edge portions of said cover being inturned to overlie the top and bottom faces of said dry cell and to press the rubber sleeve against the top surface of the insulating material at the upper end and against the bottom wall at the lower end to prevent relative axial displacement between the outer electrode and the said sleeve and cover.

9. An electric dry cell comprising an outer metal cup electrode, an inner core electrode, a layer of insulating material adjacent the upper ends of and interposed between said electrodes, a rubber sleeve encircling said outer electrode, and a cover of relatively rigid material overlying said sleeve, the upper and lower edge portions of said cover projecting over the top and bottom faces of said battery, the edges of said sleeve extending beyond said edges of said cover, and said projecting cover edges being inturned to overlie and press said rubber sleeve edges into engagement with the top surface of said layer of insulating material and with the bottom surface of said dry cell.

10. An electric dry cell comprising an outer metal cup electrode, an inner core electrode, an upper layer of insulating material interposed between said electrodes, a terminal having a depressed central portion and a flange portion, said terminal being disposed adjacent the bottom face of said cup electrode, a rubber sleeve encircling said outer electrode, a metal cover encircling said sleeve, the upper and lower edge portions of said metal cover being so constructed and arranged as to press portions of said rubber sleeve adjacent the bottom edge thereof against said flange and portions adjacent the upper edge thereof against the top surface of said insulating layer.

11. In an electric dry cell, a metal cup electrode having a side wall and a flat bottom wall, a cover member encircling said cup electrode and having a portion adjacent its lower end inturned to partially overlie the bottom wall of said electrode in an annular ring whereby said bottom wall is spaced from the external surface of said ring and a battery terminal member comprising an electrically conductive disc clamped between said electrode and said ring, said terminal member having a cup portion extending through the aperture in said ring.

12. In an electric dry cell comprising a metal cup electrode, a core electrode and an upper layer of insulating material interposed between said electrodes, resilient means for rendering the junction of said metal cup electrode and said insulating material leak-proof, said last named means comprising a cover member encircling said cup electrode and coextensive therewith, and having a portion adjacent the upper end inturned to overlie the junction of said metal cup electrode with said insulating material as well as said insulating material itself, and a member made of resilient material interposed between said inturned cover member portion and said insulating material, said resilient material being held under compression by said last named cover member portion.

BERNARD FRANCIS MULDOON.